US010148075B2

United States Patent
Loewe et al.

(10) Patent No.: US 10,148,075 B2
(45) Date of Patent: Dec. 4, 2018

(54) FASTENING CLIP AND FASTENING ASSEMBLY

(71) Applicant: Illinois Tool Works Inc., Glenview, IL (US)

(72) Inventors: Hubert Loewe, Weselberg (DE); Juergen Hofmann, Eisenberg (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/096,259

(22) Filed: Dec. 4, 2013

(65) Prior Publication Data

US 2014/0217246 A1  Aug. 7, 2014

(30) Foreign Application Priority Data

Dec. 6, 2012  (DE) .................. 10 2012 111 886

(51) Int. Cl.
*H02G 3/32* (2006.01)
*F16L 3/22* (2006.01)
*F16L 3/237* (2006.01)

(52) U.S. Cl.
CPC ............... *H02G 3/32* (2013.01); *F16L 3/222* (2013.01); *F16L 3/237* (2013.01)

(58) Field of Classification Search
CPC ......... H01R 13/627; H01R 24/84; F16L 3/22; F16L 3/222; F16L 3/223; F16L 3/237; F16L 3/24; F16L 3/1008; F16L 3/1025; F16L 3/1091; H02G 3/22; Y10T 403/61; Y10T 403/7094

USPC ......... 248/62, 65, 68.1, 73, 74.1, 74.2, 74.4; 403/331, 381
See application file for complete search history.

(56) References Cited

U.S. PATENT DOCUMENTS 3,753,212 A * 8/1973 Yamada et al. ............... 439/358
4,099,626 A * 7/1978 Magnussen, Jr. ............ 211/60.1
4,114,241 A * 9/1978 Bisping ......................... 403/188
(Continued)

FOREIGN PATENT DOCUMENTS

CN  102313081  7/2010
DE  1590545 A1 * 11/1969
(Continued)

*Primary Examiner* — Jonathan Liu
*Assistant Examiner* — Guang H Guan
(74) *Attorney, Agent, or Firm* — Joseph M. Butscher; The Small Patent Law Group, LLC

(57) ABSTRACT

A first fastening clip comprises at least one seat for a line, and at least one hermaphroditic coupling section for connecting the first fastening clip to a second fastening clip of identical construction as the first fastening clip. The hermaphroditic coupling section of the first fastening clip comprises a base surface, a first connecting portion including a groove that widens inwardly from an opening of the first connecting portion distal from the base surface, a second connecting portion including a protruding rail that has a thickened intermediate portion between opposite longitudinal narrower ends, a first locking structure, and a second locking structure. The first locking structure of the first fastening clip is configured to lock with the second locking structure of the second fastening clip, and the second locking structure of the first fastening clip is configured to lock with the first locking structure of the second fastening clip.

13 Claims, 4 Drawing Sheets

(56) References Cited

U.S. PATENT DOCUMENTS

| | | | |
|---|---|---|---|
| 4,199,070 A * | 4/1980 | Magnussen, Jr. | 211/60.1 |
| 4,202,520 A * | 5/1980 | Loos | F16L 3/222 |
| | | | 248/68.1 |
| 4,237,656 A * | 12/1980 | Hess | E05F 11/426 |
| | | | 49/352 |
| 4,244,542 A * | 1/1981 | Mathews | 248/49 |
| 4,289,366 A * | 9/1981 | Marks | 439/293 |
| 4,526,435 A * | 7/1985 | Borne et al. | 439/470 |
| 4,537,456 A * | 8/1985 | Brown et al. | 439/404 |
| 4,618,114 A | 10/1986 | McFarland | |
| 4,702,538 A * | 10/1987 | Hutter et al. | 439/292 |
| 4,908,911 A * | 3/1990 | Bretti et al. | 24/16 PB |
| 5,106,040 A * | 4/1992 | Cafmeyer et al. | 248/73 |
| 5,259,780 A * | 11/1993 | Morrissey et al. | 439/292 |
| 5,390,882 A * | 2/1995 | Lee et al. | 248/68.1 |
| 5,760,338 A * | 6/1998 | Suzuki | 174/72 A |
| 6,042,062 A * | 3/2000 | Sugiyama | 248/65 |
| 6,079,673 A * | 6/2000 | Cox | 248/63 |
| 6,311,934 B1 * | 11/2001 | Fujii et al. | 248/73 |
| 6,378,811 B1 * | 4/2002 | Potter et al. | 248/68.1 |
| 6,417,451 B1 * | 7/2002 | Uchiyama | 174/72 A |
| 6,603,073 B2 * | 8/2003 | Ferris | 174/68.3 |
| 6,840,800 B2 * | 1/2005 | Kidman | 439/535 |
| 7,395,584 B2 * | 7/2008 | Khalifa | H01R 13/28 |
| | | | 24/590.1 |
| 7,771,217 B2 * | 8/2010 | Bethurum et al. | 439/153 |
| 8,033,511 B2 * | 10/2011 | Grivas | F24F 1/0003 |
| | | | 248/58 |
| 8,299,359 B2 * | 10/2012 | Alderson et al. | 174/66 |
| 8,342,474 B2 * | 1/2013 | Gilbreath | F16L 3/222 |
| | | | 165/162 |
| 8,484,813 B2 * | 7/2013 | Taniguchi et al. | 24/586.11 |
| 8,702,044 B2 * | 4/2014 | Railsback et al. | 248/73 |
| 9,267,624 B2 * | 2/2016 | Railsback | F16L 3/2235 |
| 2003/0234116 A1 * | 12/2003 | Uchida et al. | 174/68.1 |
| 2005/0087981 A1 * | 4/2005 | Yamada et al. | 285/81 |
| 2007/0178732 A1 * | 8/2007 | Khalifa et al. | 439/157 |
| 2012/0009012 A1 | 1/2012 | Allenbach | |
| 2014/0217246 A1 * | 8/2014 | Loewe | H02G 3/32 |
| | | | 248/74.2 |

FOREIGN PATENT DOCUMENTS

| | | | |
|---|---|---|---|
| DE | 7000332 | | 1/1979 |
| DE | 19619374 C1 | * | 8/1997 |
| EP | 0191480 | | 8/1986 |
| EP | 0863350 A2 | * | 11/1998 |
| EP | 1061273 | | 12/2000 |
| EP | 1061302 | | 12/2000 |
| EP | 2221518 | | 8/2010 |
| FR | 1347130 A | * | 12/1963 |
| GB | 2235341 A | * | 2/1991 |
| JP | 10160049 | | 6/1998 |

* cited by examiner

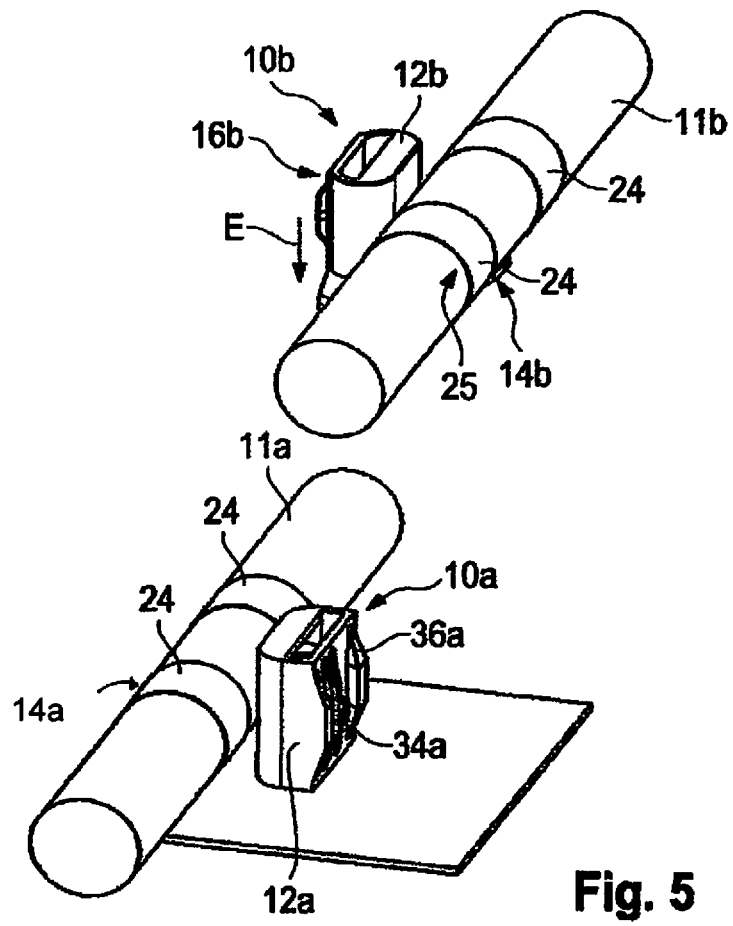
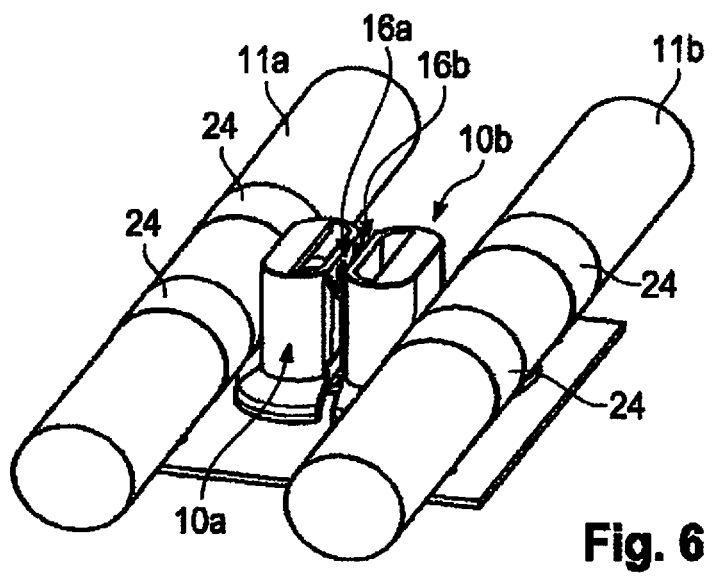

FASTENING CLIP AND FASTENING ASSEMBLY

TECHNICAL FIELD

The present invention relates to a fastening clip for at least one line and to a fastening assembly including at least two fastening clips that are more particularly of identical construction.

BACKGROUND OF THE INVENTION

Fastening clips are made use of to install lines, for example cables in a vehicle. Such a fastening clip has at least one holding section adapted to receive one or more lines or enclose the line or lines in the peripheral direction and thus fix them in position in the vehicle, and it is mounted so as to be fixed to the vehicle, so that the lines received in the holding section are reliably held in the vehicle.

For fixing such a fastening clip in place, a respective connecting structure has to be provided on the vehicle side. To reduce the number of connecting structures, line holders are known from the prior art which include a plurality of seats for one line each, so that a plurality of lines can be installed, in particular parallel. But these fastening clips can not be flexibly adjusted to the number of lines. It is further disclosed in the prior art that a plurality of fastening clips are fastened to one another, but with these fastening clips it is necessary to make sure that the connecting structures are precisely aligned. For facilitating the coupling of these fastening clips hermaphroditic coupling section are provided at each fastening clip. Such a fastening clip is shown in JP 10160049 A.

It is the object of the invention to provide a fastening clip and a fastening assembly including a plurality of fastening clips which allows the individual fastening clips to be simply and flexibly fastened to each other.

BRIEF SUMMARY OF THE INVENTION

To achieve the object, provision is made for a fastening clip for at least one line has at least one holding section that includes a seat for the line, and at least one hermaphroditic coupling section for connecting the fastening clip to a second fastening clip of identical construction. The first connecting structure has a groove that in particular widens away from an oblong opening and is open in the longitudinal direction, and the second connecting structure has a protruding rail that can engage into the groove and in particular has a thickened portion on its free end. According to the invention a first locking structure and a second locking structure corresponding to the first locking structure are provided at the coupling section, the second locking structure being arranged offset by 180 degrees in relation to the first locking structure the locking structures being in particular arranged such that the first locking structure of a first fastening clip can lock with the second locking structure of a second fastening clip having an identical coupling section, and the second locking structure of the first fastening clip can lock with the first locking structure of the second fastening clip.

A hermaphroditic coupling section of this type is configured such that it can be coupled to a second coupling section of identical construction which is rotated through 180 degrees in relation to the first coupling section so as to produce a reliable connection between the two coupling sections and thus the two fastening clips. While corresponding coupling sections are provided in fastening clips that have been used so far, the coupling sections are configured differently, so that two fastening clips with identical coupling sections can not be fitted to each other. This means that either two sorts of fastening clips with different coupling sections or fastening clips with two separate, different coupling sections have to be kept in stock. The coupling section of the fastening clip according to the invention is formed such that two fastening clips having identical coupling sections of this type can be fastened to each other in a simple manner. Since only one sort of coupling sections is provided, it is not required to pay attention to the type of coupling section or the orientation thereof. This allows a considerably faster and simpler assembly of the fastening clip. In addition, only fastening clips with one type of coupling section need to be kept in stock, as a result of which the manufacturing costs are further reduced. The rail provided on the second connecting structure of a second fastening clip of identical construction can be inserted into the groove of the first fastening clip. At the same time, the groove of the second fastening clip is pushed onto the rail of the first fastening clip, so that a reliable connection is produced between the fastening clips. Both locking members preferably have the same distance from a center plane arranged between the connecting structures and having the same distance from both connecting structures. This ensures that the locking structures of a second fastening clip having an identical coupling section, which is rotated through 180 degrees and fitted to the first fastening clip such that the connecting structures engage into each other, can also cooperate in respect of the locking members.

Provided on the hermaphroditic coupling section are, for example, a first connecting structure and a second connecting structure corresponding to the first connecting structure, the second connecting structure being arranged on the coupling section in a manner rotated through 180 degrees and offset in relation to the first connecting structure. The connecting structures are in particular arranged such that the first connecting structure of a first fastening clip can engage into the second connecting structure of a second fastening clip having an identical coupling section, and the second connecting structure of the first fastening clip can engage into the first connecting structure of the second fastening clip. The connecting structures may be arranged on the fastening clip and/or on the coupling section as desired. It is only to be made sure that the coupling section of a second fastening clip of identical construction can be guided to the coupling section of a first fastening clip, so that the connecting structures can engage into each other. Preferably, to this end, the first and second connecting structures need to be relatively rotated through 180 degrees.

Preferably, the groove and the rail extend transversely to the longitudinal direction of the seat. This allows the fastening clip to be shifted on a fitted line in the longitudinal direction without the risk of the connection of two neighboring fastening clips being released again due to the grooves and the rails being shifted.

The locking structures may be formed by locking tabs, for example, which are formed to be mirror-inverted in relation to a plane that is perpendicular to the longitudinal direction of the groove and the rail, with the locking tabs, however, being arranged offset in the longitudinal direction of the seat, rather than directly opposite each other.

Preferably provided on the fastening clip is a fastening section which in particular has a seat for a fastening pin to mount the fastening clip so that it is fixed to the vehicle. When a plurality of these fastening clips are mounted to each other, owing to the reliable coupling of the fastening clips by means of the coupling sections, it is sufficient to fasten one single fastening clip to a fastening pin to mount an entire assembly including a plurality of fastening clips firmly to the vehicle.

The fastening seat extends, for example, perpendicularly to the longitudinal direction of the seat for the line, so that a line held in the mounted fastening clip can be led parallel to a vehicle-fixed component. Preferably, locating members, in particular locking members for the fastening pin, are provided in the fastening seat, which are adapted to locate the fastening clip on the fastening pin.

In order to fit a plurality of fastening clips of identical construction to each other, provision is advantageously made for two coupling sections on the fastening clip, which are more particularly provided on opposite sides, so that a fastening clip of identical construction or a fastening clip with an identical coupling section may be mounted on either side of a fastening clip according to the invention.

Further provision is made according to the invention for a fastening assembly including at least two fastening clips according to the invention, in particular of identical construction, the second fastening clip being rotated such that the coupling section of the second fastening clip is coupled to the coupling section of the first fastening clip. The second fastening clip is preferably rotated through 180 degrees.

The fastening clips preferably each include a first connecting structure and a second connecting structure corresponding to the first connecting structure, the first connecting structure of the first fastening clip being adapted to engage into the second connecting structure of the second fastening clip, and the second connecting structure of the first fastening clip being adapted to engage into the first connecting structure of the second fastening clip.

The first connecting structures may, for example, each have a groove that in particular widens away from the surface, and the second connecting structures may each have a rail that can engage into the groove and in particular has a thickened portion on its free end, the thickened portion extending in the longitudinal direction. In particular, the grooves and the rails may extend transversely to the longitudinal direction of the seat.

The fastening clips may each include a first locking structure and a second locking structure corresponding to the first locking structure, the first locking structure of the first fastening clip being adapted to lock with the second locking structure of the second fastening clip, and the second locking structure of the first fastening clip being adapted to lock with the first locking structure of the second fastening clip.

At least one of the fastening clips may have two coupling sections, in particular opposite each other, so that two fastening clips having identical coupling sections may be fastened to it, thus also allowing a plurality of fastening clips to be fastened to one another.

BRIEF DESCRIPTION OF THE DRAWINGS

FIG. 5 shows the fastening assembly of FIG. 4 in a second assembly step;

FIG. 6 shows the fastening assembly of FIG. 4 in the assembled state;

DETAILED DESCRIPTION OF AN EMBODIMENT

Figure 1:
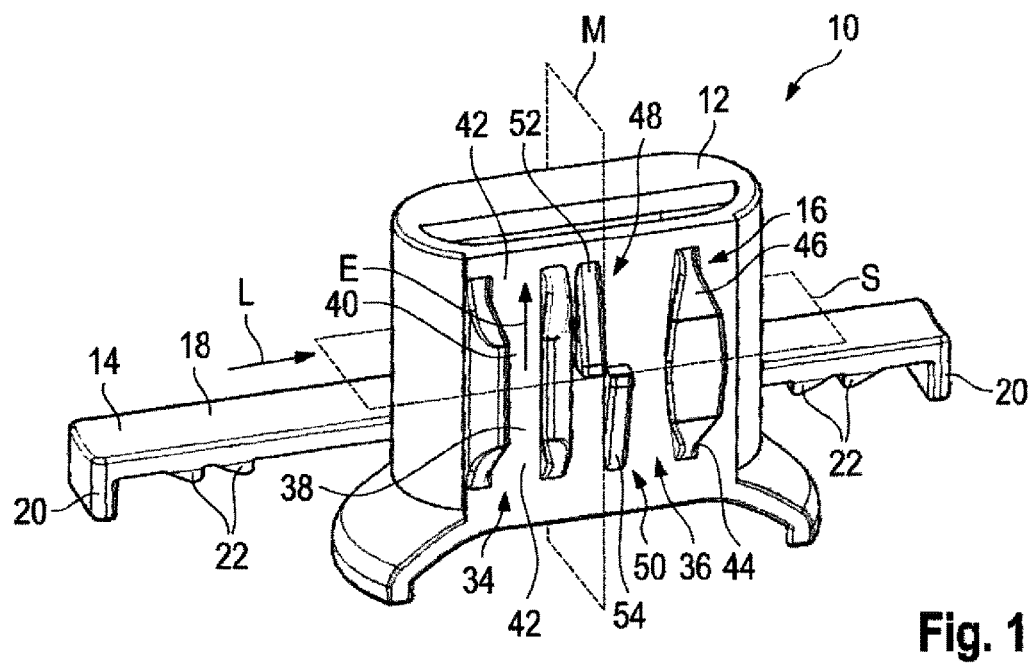
FIG. 1 shows a first perspective view of a fastening clip according to the invention.
Figure 2:
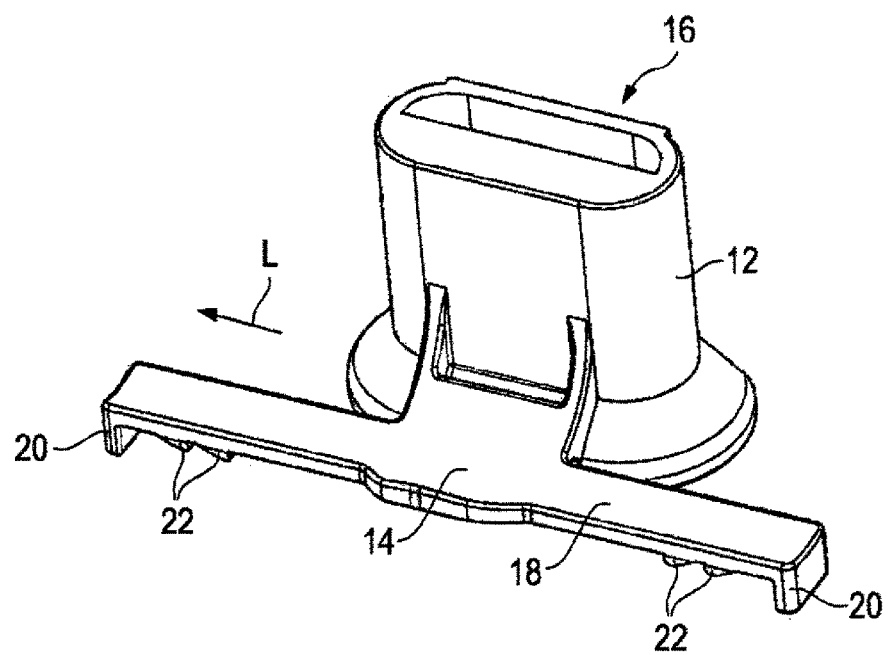
FIG. 2 shows a second perspective view of the fastening clip of FIG. 1.
Figure 3:
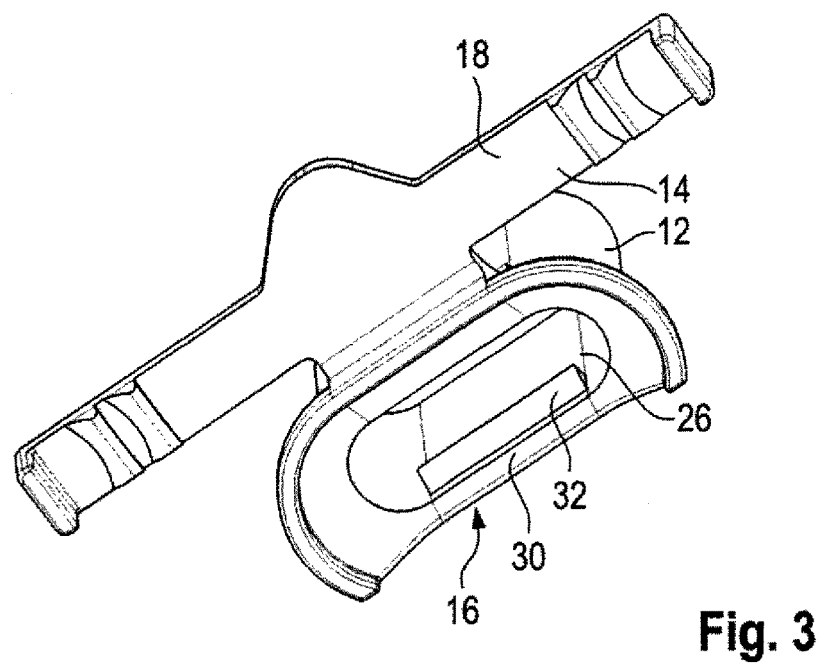
FIG. 3 shows a third perspective view of the fastening clip of FIG. 1.

FIGS. 1 to 3 show a fastening clip 10 for a line 11 (see FIGS. 4 to 6), for example a cable. The fastening clip 10 has a fastening section 12 for mounting the fastening clip 10 firmly to a vehicle, and has a holding section 14 for the line 11 and a coupling section 16 for coupling the fastening clip 10 to a second fastening clip 10 of identical construction.

The holding section 14 has a web 18 extending in a longitudinal direction L and having a plurality of spacers 20 which may rest against a vehicle-fixed component. Further provided on the web 18 are a plurality of locking noses 22 on which a clamp 24 (see FIGS. 4 to 6), a cable tie or a similar component for fixing a line 11 in place can be held which forms a seat 25 for the line.

The fastening section 12 includes a fastening seat 26 for a fastening pin 28 (see FIG. 4), the fastening seat 26 extending transversely to the longitudinal direction L of the web 18 or of the seat 25. Provided in the fastening seat 26 are locating members, which in the embodiment shown here are locking members 30, which can lock in place on the fastening pin 28 and fix the fastening clip 10 in place thereon.

The outer wall 32 of the fastening seat 26 is made to be flexible, so that the latter can be adjusted to fastening pins 28 of different shapes and/or sizes.

The coupling section 16 of the fastening clip 10 includes a base surface, a first connecting structure 34 and a second connecting structure 36.

The first connecting structure 34 includes a groove 38 and defines an oblong opening 40 distal from the base surface. The groove 38 widens inwardly away from the oblong opening 40. In the direction of extent E of the groove 38, the groove 38 is open and has respective openings 42 at its ends.

The second connecting structure 36 is formed by a rail 44 extending parallel to the groove 38 and having at its free end a thickened portion 46 that extends in the direction of extent E of the groove 38 and becomes narrower at its end points in the direction of extent E.

The second connecting structure 36 is formed to correspond to the first connecting structure 34, that is, the rail 44 is formed such that it could be inserted by its thickened portion 46 into the groove 38 in the direction of extent E, so that an interlocking connection could be established transversely to the direction of extent E and to the longitudinal direction L.

In relation to the first connecting structure 34, the second connecting structure 36 is, however, arranged on the coupling section in a manner rotated through 180 degrees, so that both connecting structures 34, 36 point in the same direction.

Further, in relation to the first connecting structure, the second connecting structure 36 is arranged on the coupling section 16 offset in the longitudinal direction L of the seat 25 and transversely to the direction of extent E which in the embodiment shown here is arranged perpendicularly to the longitudinal direction L of the seat 25. With respect to a mirror plane S (see FIG. 7) arranged perpendicularly to the direction of extent E, the connecting structures are formed to be mirror-inverted.

Further provided on the coupling section 16 are locking structures 48, 50 which are each formed by a resilient locking tab 52, 54. The locking tabs 52, 54 likewise extend in the longitudinal direction E of the groove 38. Moreover, the locking structures 48, 50 are also offset relative to each other in the longitudinal direction L. With respect to the mirror plane S, the locking tabs 52, 54 are of a mirror-symmetrical configuration, with the locking tabs, as already explained, being arranged offset in the longitudinal direction L relative to this mirror plane S, rather than opposite each other.

Figure 7:
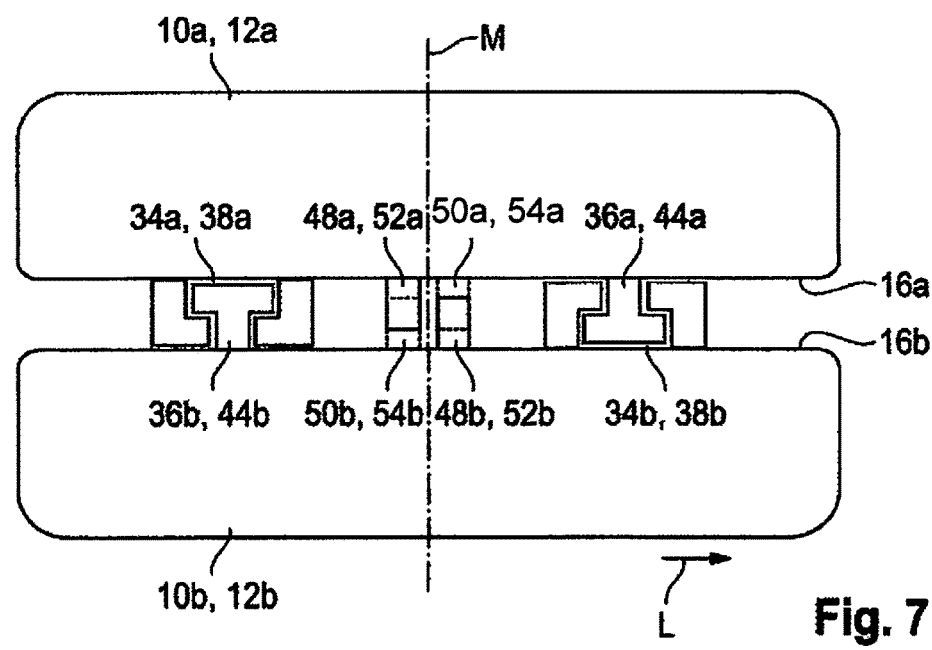
FIG. 7 shows a sectional view of the coupling sections of the fastening clips of the assembled fastening assembly of FIG. 6.

As can be seen in particular in FIGS. 1 and 7, with respect to a virtual center plane M, the first connecting structure 34 and the first locking structure 48 are situated on a first side of this center plane M, and the second connecting structure 36 and the second locking structure 50 are situated on the second side of the center plane M. The center axes of the first connecting structure 34 or the groove 38 and of the second connecting structure 36 or the rail 44 have the same distance from this center plane M. The distance of the two locking structures 48, 50 from the center plane M is also the same.

Figure 4:
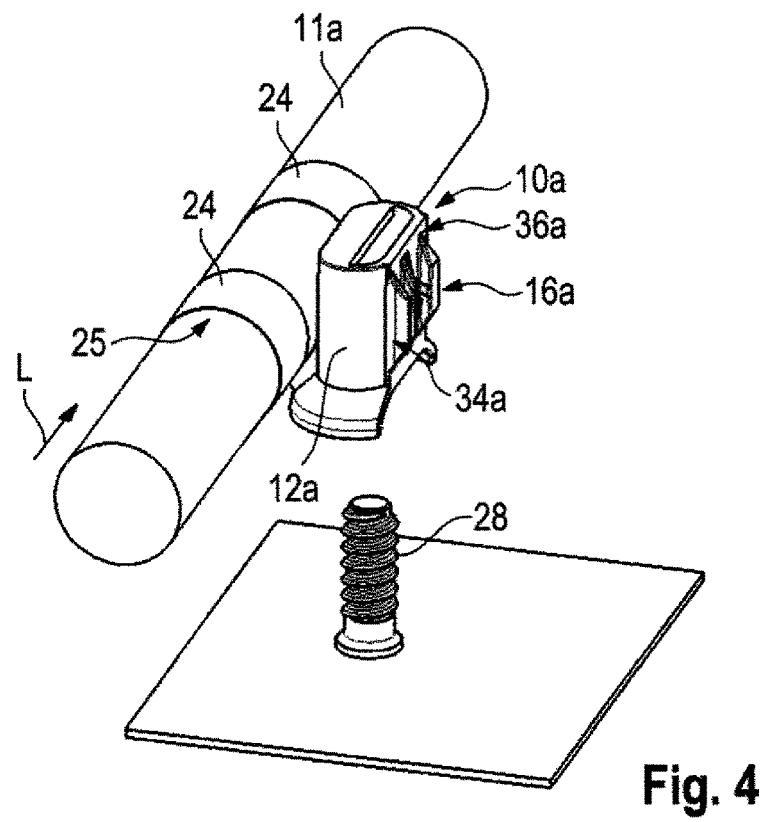
FIG. 4 shows a first fastening clip of a fastening assembly according to the invention during assembly.

The fastening clip 10 according to the invention may be made use of to mount a plurality of lines firmly to the vehicle. To this end, a line 11a is fitted to a first fastening clip 10a, and subsequently a second fastening clip 10b is mounted by its coupling section 16b to the coupling section 16a of the first fastening clip 10a (FIGS. 4 to 6). As will be discussed below, the coupling sections 16a, 16b produce a coupling between the fastening clips 10a, 10b, so that only one of the fastening clips 10a, 10b needs to be fastened firmly to the vehicle, for example to a fastening pin 28.

The assembly and function of such a fastening assembly including two fastening clips 10a, 10b of identical construction is illustrated in FIGS. 4 to 6.

Both fastening clips 10a, 10b are identically constructed in this embodiment, it being merely required that both fastening clips each include an identical hermaphroditic coupling section 16a, 16b. The remaining design of the fastening clip 10a, 10b, in particular the configuration of the holding sections 14a, 14b, may be selected as desired.

In a first assembly step (FIG. 4), a first fastening clip 10a with a line 11a fitted thereto is mounted to a vehicle-fixed fastening pin 28. To this end, the fastening clip 10a is pushed by its fastening seat 26a onto the fastening pin 28, the locking members 30 of the fastening clip 10a locking in place on the fastening pin.

But, in principle, the line 11a may be fitted to the holding section 14a also after the fastening clip 10a is mounted to the fastening pin 28.

Then a second fastening clip 10b of identical construction, which has a line 11b fitted thereto, is mounted to the first fastening clip 10a (FIGS. 5 and 6). To this end, the second fastening clip 10b is rotated by 180 degrees in relation to the first fastening clip 10a, so that the coupling sections 16a, 16b are oriented to face each other.

The second fastening clip 10b is slid onto the first fastening clip 10a in the direction of extent E, the rail 44b of the second fastening clip 10b engaging into the groove 38a of the first fastening clip 10a and the groove 38b of the second fastening clip 10b being pushed onto the rail 44a of the first fastening clip 10a (FIGS. 6 and 7).

Thus, the first connecting structure 34a of the first fastening clip 10a engages with the second connecting structure 36b of the second fastening clip 10b and the second connecting structure 36a of the first fastening clip 10a engages with the first connecting structure 34b of the second fastening clip 10b.

The hermaphroditic configuration of the coupling sections 16 in this way allows an assembly of two identically constructed coupling sections 16 and an assembly of two fastening clips 10a, 10b having identical hermaphroditic coupling sections 16a, 16b.

When the second fastening clip 10b has been pushed fully onto the first fastening clip 10a, the locking tab 52a of the first locking structure 48a of the first fastening clip 10a locks with the locking tab 54b of the second locking structure 50b of the second fastening clip 10b. Likewise, the locking tab 54a of the second locking structure 50a of the first fastening clip 10a locks with the locking tab 52b of the first locking structure 48b of the second fastening clip 10b.

The connection of the first locking structure 48a of the first fastening clip 10a with the second locking structure 50b of the second fastening clip 10b prevents the second fastening clip 10b from being further shifted in the longitudinal direction E of the groove. The coupling of the second locking structure 50a of the first fastening clip 10a to the first locking structure 48b of the second fastening clip 10b prevents a shifting counter to the longitudinal direction E, so that a shifting of the fastening clips 10a, 10b in the direction of extent E is impossible.

In combination with the interlocking connection of the connecting structures 34a and 36b and, respectively, 36a and 34b, the two fastening clips 10a, 10b are reliably coupled to each other.

Figure 8:
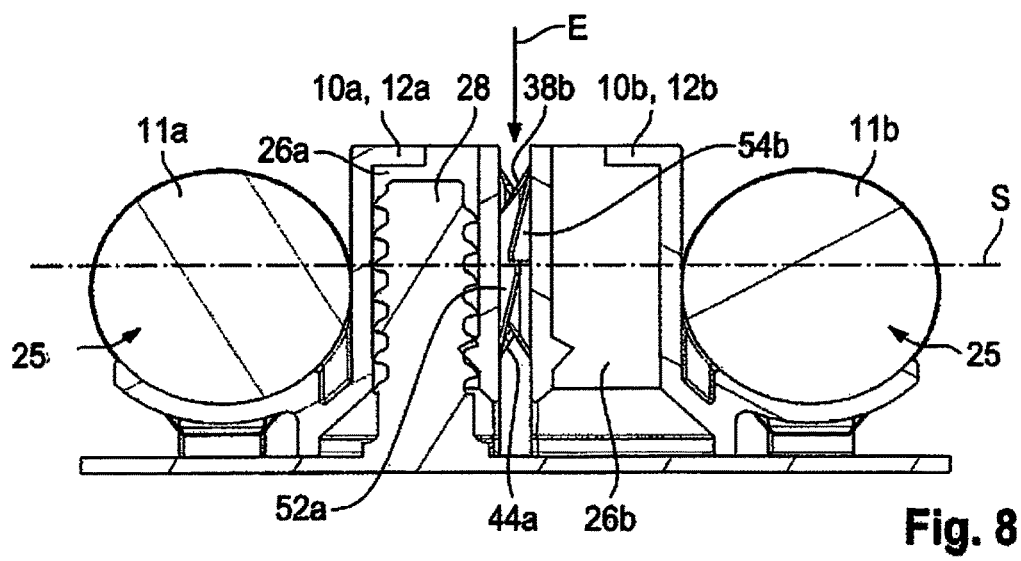
FIG. 8 shows a second sectional view of the fastening assembly of FIG. 6.

As can be seen in FIGS. 7 and 8, in the assembled state the center planes M and the mirror planes S of both fastening clips 10 each lie in one plane.

It is also conceivable that two coupling sections 16 are provided on a fastening clip 10, the coupling sections 16 being formed on the fastening clip 10 on opposite sides, so that a further fastening clip 10 can be mounted on either side.

Departing from the embodiment shown here, the coupling sections 16a, 16b may also have a curved surface. It is only required to make sure that the coupling sections 16a, 16b are formed such that the connecting structures 34a and 36b and, respectively, 36a and 34b and the locking structures 48a and 50b and, respectively, 48b and 50a can engage into each other.

The invention claimed is:

1. A first fastening clip configured to securely retain a line and engage a second fastening clip of identical construction as the first fastening clip, the first fastening clip comprising:
   a holding section, wherein the holding section includes a line seat configured to retain the line;
   a hermaphroditic coupling section for connecting the first fastening clip to the second fastening clip, wherein the hermaphroditic coupling section comprises:
   a base surface;
   a first connecting portion, wherein the first connecting portion has a groove, wherein the first connecting portion defines an opening distal from the base surface, wherein the groove widens inwardly from the opening defined by the first connecting portion;
   a second connecting portion, wherein the second connecting portion has a protruding rail, wherein the protruding rail includes opposite longitudinal narrower ends and a thickened intermediate portion between the opposite longitudinal narrower ends;
   a first locking structure; and
   a second locking structure being identical and mirror-inverted to the first locking structure; and a fastening section having a fastening seat;
wherein the fastening seat of the fastening section of the first fastening clip receives a fastening pin to mount the first fastening clip to a vehicle;
wherein the protruding rail of the second connecting portion of the first fastening clip is configured to engage the groove of the first connecting portion of the second fastening clip;
wherein the first locking structure of the first fastening clip is configured to directly engage the second locking structure of the second fastening clip;
wherein the second locking structure of the first fastening clip is configured to directly engage the first locking structure of the second fastening clip; and
wherein the first fastening clip is configured to fasten to the second fastening clip by the engagement of the first locking structure of the first fastening clip with the second locking structure of the second fastening clip and the engagement of the second locking structure of the first fastening clip with the first locking structure of the second fastening clip.

2. The first fastening clip of claim 1, wherein the second connecting portion of the first fastening clip is spaced from the first connecting portion of the first fastening clip.

3. The first fastening clip of claim 2, wherein the first connecting portion of the first fastening clip is configured to engage the second connecting portion of the second fastening clip, and wherein the second connecting portion of the first fastening clip is configured to engage the first connecting portion of the second fastening clip.

4. The first fastening clip of claim 1, wherein the line seat of the holding section of the first fastening clip extends in a longitudinal direction, and wherein the first connecting portion of the first fastening clip is offset from the second connecting portion of the first fastening clip along the longitudinal direction.

5. The first fastening clip of claim 1, wherein the line seat of the holding section of the first fastening clip extends in a longitudinal direction, and wherein the groove of the first connecting portion of the first fastening clip and the protruding rail of the second connecting portion of the first fastening clip extend in a direction transverse to the longitudinal direction.

6. The first fastening clip of claim 1, wherein each of the first and second locking structures of the first fastening clip includes a locking tab, and wherein the locking tabs of the first and second locking structures of the first fastening clip are mirror-inverted.

7. The first fastening clip of claim 1, wherein the fastening seat of the fastening section of the first fastening clip includes locating members.

8. The first fastening clip of claim 7, wherein the fastening seat of the fastening section of the first fastening clip further includes locking members for engaging the fastening pin.

9. The first fastening clip of claim 1, wherein the fastening seat of the fastening section of the first fastening clip includes an opening that receives the fastening pin to mount the first fastening clip to the vehicle.

10. A fastening assembly comprising: the first fastening clip of claim 1 and the second fastening clip of identical construction as the first fastening clip; wherein the second fastening clip is configured to be arranged to allow the hermaphroditic coupling section of the second fastening clip to be coupled to the hermaphroditic coupling section of the first fastening clip.

11. The fastening assembly of claim 10, wherein the first connecting portion of the first fastening clip is configured to engage the second connecting portion of the second fastening clip, and wherein the second connecting portion of the first fastening clip is configured to engage the first connecting portion of the second fastening clip.

12. A fastening assembly comprising: a first fastening clip and a second fastening clip, wherein each of the first and second fastening clips comprises:
a holding section including a line seat for at least one line;
a hermaphroditic coupling section comprising:
a base surface;
a first connecting portion, wherein the first connecting portion has a groove, wherein the first connecting portion defines an opening distal from the base surface, wherein the groove widens inwardly from the opening defined by the first connecting portion;
a second connecting portion, wherein the second connecting portion has a protruding rail, wherein the protruding rail includes opposite longitudinal narrower ends and a thickened intermediate portion between the opposite longitudinal narrower ends;
a first locking structure; and
a second locking structure being identical and mirror-inverted to the first locking structure; and
a fastening section having a fastening seat;
wherein the fastening seat of the fastening section of the first fastening clip is configured to receive a fastening pin to mount the first fastening clip to a vehicle;
wherein the protruding rail of the second connecting portion of the first fastening clip engages the groove of the first connecting portion of the second fastening clip;
wherein the first locking structure of the first fastening clip directly engages the second locking structure of the second fastening clip;
wherein the second locking structure of the first fastening clip directly engages the first locking structure of the second fastening clip; and
wherein the first fastening clip is fastened to the second fastening clip by the engagement of the first locking structure of the first fastening clip with the second locking structure of the second fastening clip and the engagement of the second locking structure of the first fastening clip with the first locking structure of the second fastening clip.

13. The fastening assembly of claim 12, wherein the fastening seat of the fastening section of each of the first and second fastening clips includes locating members and locking members.

* * * * *